United States Patent [19]
Fisher et al.

[11] 3,751,991
[45] Aug. 14, 1973

[54] PARTICULATE SOLID MATERIAL INSPECTION SYSTEM

[75] Inventors: Glen W. Fisher, Bellevue; Fred A. Franz, Mercer Island, both of Wash.

[73] Assignee: Technovator, Inc., Seattle, Wash.

[22] Filed: May 21, 1971

[21] Appl. No.: 145,784

[52] U.S. Cl................. 73/421 R, 73/423 R, 73/424
[51] Int. Cl............................................... G01r 1/20
[58] Field of Search ..................... 73/421 R, 421 B, 73/422 R, 423 R, 424

[56] References Cited
UNITED STATES PATENTS
2,738,679 3/1956 Senkowski ...................... 73/423 R

| | | | |
|---|---|---|---|
| 3,252,328 | 5/1966 | Huntington | 73/423 R |
| 3,279,259 | 10/1966 | Haley et al. | 73/421 B |
| 3,006,367 | 10/1961 | Thompson | 73/422 R |

FOREIGN PATENTS OR APPLICATIONS
425,930  3/1935  Great Britain..................... 73/424

*Primary Examiner*—S. Clement Swisher
*Attorney*—Seed, Berry, Dowrey & Cross

[57] ABSTRACT

Particulate solid material is automatically sampled while bags are being packed and the bags are automatically weighed and counted. A preferred form of sampler intercepts the entire transverse cross-section of the stream of material momentarily to remove an unbiased sample from the stream.

7 Claims, 7 Drawing Figures

PATENTED AUG 14 1973 3,751,991

INVENTOR.
GLEN W. FISHER
FRED A. FRANZ
BY
*Seed, Berry, Dawrey & Cross*
ATTORNEYS

INVENTORS
GLEN W. FISHER
FRED A. FRANZ
ATTORNEYS

INVENTORS
GLEN W. FISHER
FRED A. FRANZ
BY
ATTORNEYS

PARTICULATE SOLID MATERIAL INSPECTION SYSTEM

BACKGROUND OF THE INVENTION

1. Field of the Invention

This invention pertains to automatic inspection systems for determining automatically the total weight of the bags weighed and the number of bags weighed in a lot and for the removal of a sample of the material flowing into the bags. In addition, the invention pertains to a sampling system for removal of a sample from the material flowing in a stream of solid particulate material.

2. Description of the Prior Art

As a necessary adjunct of any solid particulate packing, handling, or processing operation there must be an adequate inspection system to comply with Government regulations and/or to meet with customer requirements and for the operator's own information. In the case of a packing system requiring Government inspection the inspection includes removal of an unbiased sample, a tabulation of the number of bags in a lot, and a calculation of the average weight of the filled bags in the lot. It is also a requirement that this inspection be done with maximum security to prevent accidental or intentional deviations from the lot specifications. Heretofore this inspection was obtained only by the use of trained inspectors who removed samples from the material for analysis and also manually counted and weighed each or selected numbers of the bags in each lot. Obviously manual inspection of such a large percentage of the bags was costly and placed demands on the limited number of Government inspectors.

Another difficulty presented by prior art inspection systems is that the sample taken from the main stream of solid particulate material has invariably been unreliable because it has not been truly representative of the entire transverse cross-section of the material in the stream but rather has represented merely some unknown segment of a transverse cross-sectional layer of the stream. Typical of these prior art samplers is the Vezin sampler which obtains a sample by cutting or sweeping through a free-falling flow of material with an open-ended receptacle or conduit. In a Vezin sampler a finite amount of time is required to sweep the receptacle through the entire cross-section of the stream since there are limitations on the speed with which the receptacle may be moved in the stream. In sweeping across the transverse cross-section of the stream the first material gathered by the sampler is from an edge of the main stream, the last material removed by the sampler is from the opposite edge of the stream and material taken from central planes parallel to the direction of flow of the main stream is distributed between these edge samples. A secondary sample is then removed by taking a second cut or sweep from the first portion removed. As is apparent, the secondary sample represents only a small segment (less than an entire transverse cross-section) of any transverse layer of material, and as such, the secondary sample does not accurately represent the total cross-sectional flow of material in the main stream.

SUMMARY OF THE INVENTION

One aspect of this invention is to provide a system for automatically removing samples from a flow of solid particulate material in a packing spout, and counting and weighing the bags packed, all in a manner providing security against inadvertent or intentional inaccuracies in the sampling procedure.

It is another object of this invention to provide an inspection system which automatically records cumulative weight and number of bags weighed in a particular lot.

It is another object of this invention to provide an integrated sampling, weighing and counting system for a solid particulate material packing machine.

Another aspect of the invention is to provide a sampler which samples an entire transverse cross-section of the material stream regardless of whether the stream is in a full-spout condition or is free-falling.

Another object of this aspect of the invention is to provide a sampler which intercepts an entire transverse cross-section of the stream momentarily by diverting it along a secondary path having a mass flow restriction and then samples the material downstream of the restriction.

A primary object of this invention is thus to provide a sampler that removes a sample representative of an entire transverse cross-section of the material in the stream and which takes the sample under maximum security to avoid intentional or inadvertent bias.

DESCRIPTION OF THE PREFERRED EMBODIMENTS

Figure 1:
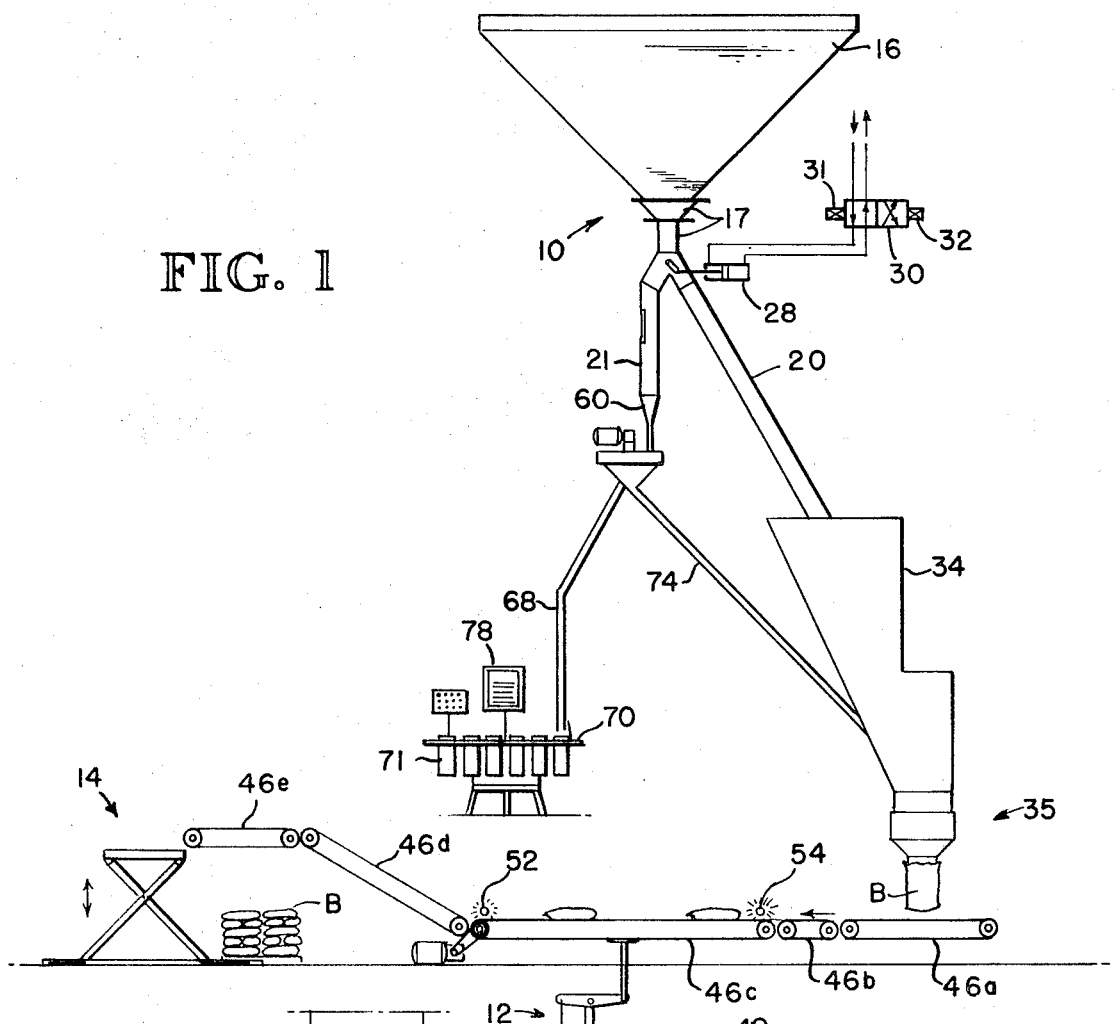
FIG. 1 schematically illustrates a completely integrated bag packing and inspecting system embodying the principles of the invention.

As best shown in FIG. 1 a packer unit 10 is operatively connected to a weighing and counting unit 12 which delivers the filled bags to a palletizer 14. The bags B are generally filled to a 50 or 100 pound weight and at the weighing and counting unit the weights are accumulated for a desired number of bags or period of time. The bags are counted preferably in a manner which counts only those bags actually weighed to arrive at an average bag weight.

The packer unit 10 may be of any conventional design suitable for handling solid particulate material either of the type having a big range of particle size, such as bulgur or of the type having a small particle size range, such as flour or cement. It should be understood, of course, that the latter type materials do not readily flow by gravity and thus the packer would require the addition of a mechanical conveyor of some kind for moving the material therethrough. In the preferred packer shown in FIG. 1 gravity is used to move the material and thus would be used for the material of high range of particle size.

Figure 5:
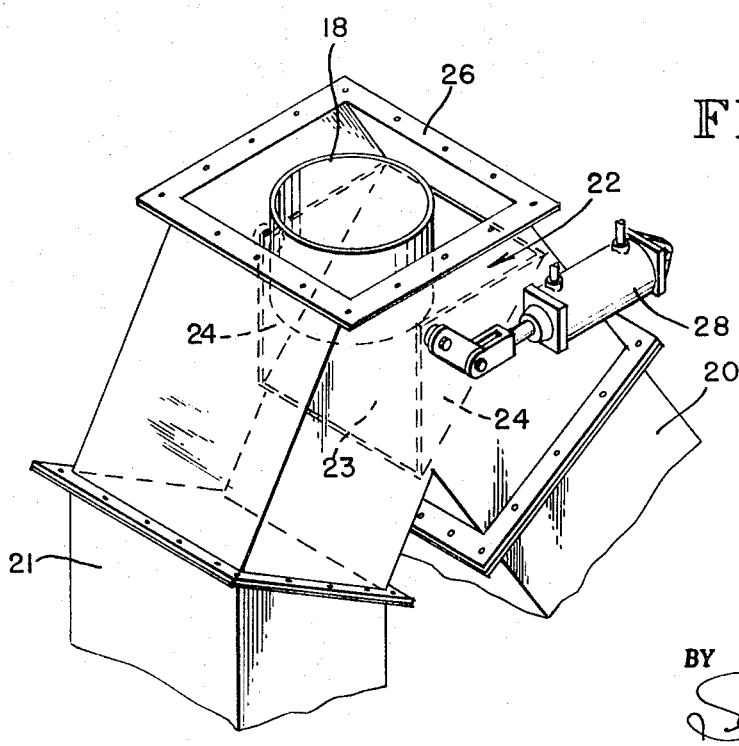
FIG. 5 is an isometric of the diverter valve used in the inspection system of FIG. 1.

The packer unit 10 includes a supply of material such as bin 16 having a restricted discharge opening 17 which terminates in a downwardly extending tube 18 (FIG. 5). The material discharged through the tube 18 is selectively discharged either to a main spout 20 or to a secondary spout 21. As best shown in FIG. 5 the entire transverse cross-section of the stream is diverted momentarily by a diverted valve 22. The diverter valve 22 includes a flat plate 23 terminating in upturned triangular end plates 24. The end plates are pivotally mounted in a housing 26 which joins the tube 18 to the main and secondary spouts 20 and 21. The diverter valve is linked to a piston rod of a piston-cylinder assembly 28. The piston is positioned pneumatically by a conventional two-way solenoid operated valve 30 controlled by a return solenoid 31 and a divert solenoid 32. This type of diverter valve is most effective to penetrate through the material when in a full-spout condition since the plates 23 and 24 must cut through the material. It should be understood, of course, that this same diverter valve could be used for material in a free-falling condition as well and the invention is not to be limited to a particular condition of the stream in the spout. In FIG. 5 the valve is illustrated in the divert position with the full stream diverted into the secondary spout 21.

Figure 6:
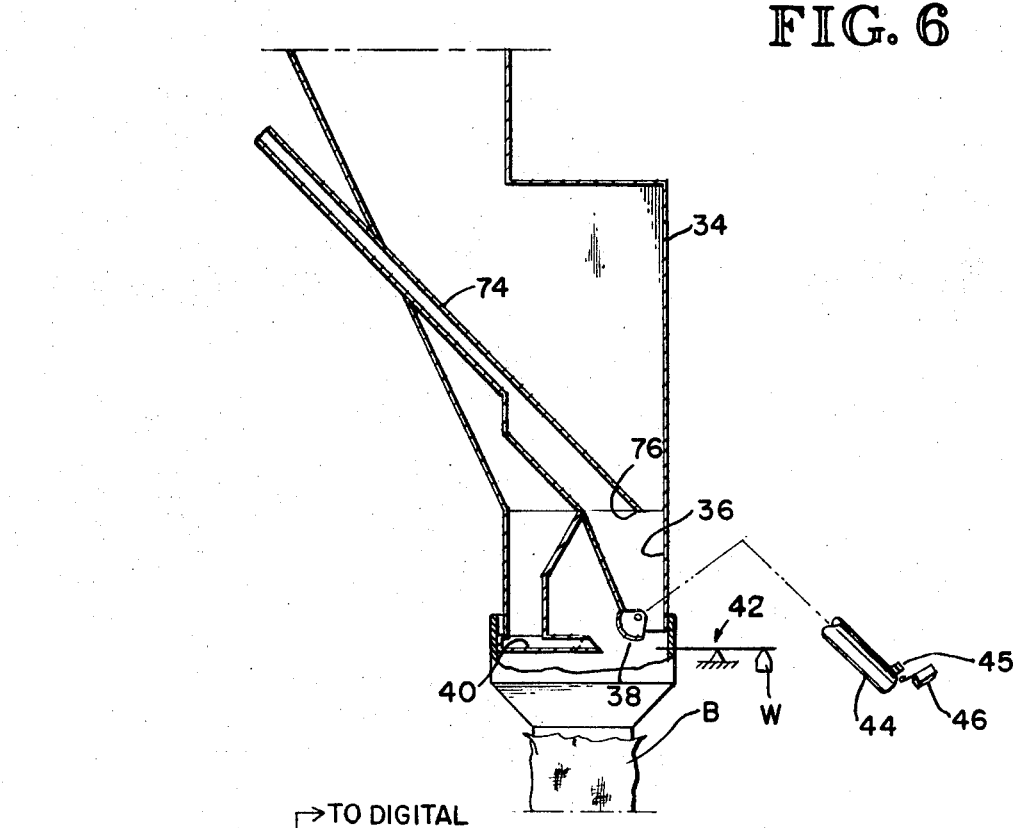
FIG. 6 is a fragmentary detail of one of the bag packing units employed in the bag packer of FIG. 1.

Material passing through the main spout 20 flows into a main hopper 34 which terminates in the preferred embodiment in two alternately actuated discharge hoppers 35 (only one being illustrated). Each discharge hopper employs a main feeder 36 (FIG. 6) the discharge of which is controlled by a scale operated clamshell gate 38. A dribbler feeder 40 is employed in a conventional manner to provide a continuous flow into the bag at a greatly reduced rate. As is well understood in the art the clamshell valve is operatively connected to a scale mechanism 42 which is set to allow the clamshell gate to trip and close after an amount of material fills the scale-supported bag B equivalent to the weight position on the scale mechanism 42. This weight setting is slightly less than the desired bag-weight. The dribbler feeder generally employs a vibrator or the like to provide a topping flow into the bag to bring it to the desired weight. Although not illustrated the packer illustrated is of the type in which a bag is manually placed beneath the feeders and is automatically held in position while the bag is filled. As is also well understood as one bag is placed beneath the feeder illustrated a filled bag may be removed from the alternate feeder not illustrated so that the flow through the main spout 20 is generally continuous even though the bags are filled intermittently. The clamshell gate for the discharge hopper illustrated is keyed to a shaft 44 which oscillates each time the clamshell is open. The shaft is provided with a switch operator 45 which actuates a switch 46 each time the shaft is oscillated. Thus in the preferred embodiment the switch 46 will be actuated for every other bag filled. The switch provides a bag counting signal which is used in the automatic sample control and/or for a scale weight zero print-out as will be described in more detail below.

Filled bags are carried away from the packer on a plurality of conveyors 46a – 46e. The weighing and counting unit 12 is a conventional type such as available from Howe-Richardson Scale Company of Clifton, N.J., and is incorporated into the conveyor 46c. It employs a conventional load cell 48 to sense the weight of the filled bag on the conveyor. This weight is electronically sent to a digital indicator 49 and the signal that the bag has been weighed is sent to a totalizer 50. The digital indicator is conventional and accumulates the weights of the bags weighed for a predetermined number of bags and/or period of time. The totalizer also is conventional and totalizes the number of bags actually weighed and thus whose weights are computed in the digital indicator. Since bags are occasionally out of place on the conveyors a pair of photocells 52 and 54 sense the presence and location of the bags on the conveyors and control the load cell so that only properly spaced bags will be weighed. Thus, all of the bags packed will not necessarily be weighed but since the totalizer computes only those bags actually weighed the print-out from the digital indicator and totalizer will provide figures to easily compute average weight of the bags weighed.

One of the requirements of the United States Department of Agriculture (U.S.D.A) is that the digital indicator print a zero-weight print-out at predetermined intervals. In this application the interval is 70 bags, a convenient number representing a pallet-size load. A zero weight print-out is the weight sensed by the load cell without a bag on the conveyor 46c. Thus by weighing the empty conveyor 46c and zeroing the load cell for the empty conveyor the actual weight of the filled bag is the only thing weighed when filled bags are on the conveyor. Since the load cell has a slight tendency to drift the 70 bag zero-weight print-out provides an accurate control for correcting for any deviation should one appear. It is one feature of this invention that the switch 46 provides an ideal means of arriving at the predetermined interval to trigger the zero-weight print-out.

Figure 2:
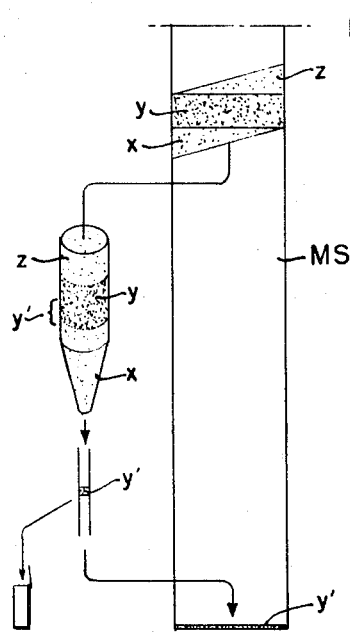
FIG. 2 is a diagramatic illustration of an unbiased sampling technique wherein the sample is representative of the entire transverse cross-section of the stream being sampled.

As thus far described it can be seen that the inspection system of sampling and bag counting and weighing can be accomplished for material in either a free-falling condition or a full-spout condition, and for materials flowing by gravity or those requiring a mechanized means for forcing the material through the spout. It is also apparent that any type of sampling could be employed in this inspection system. It is a unique feature of this invention, however, to provide a sampler which removes a sample representative of the entire transverse cross-section of the main stream of material. Compared to this and as mentioned earlier, prior art samplers generally swept across the transverse cross section of the main stream. This is not the case in the sampler of this application the theory of operation of which is best illustrated in FIG. 2. In FIG. 2 the main stream of material is indicated by the reference characters MS. As the diverter valve 22 is moved from covering the secondary spout 21 to cover the main spout 20 and thus diverts the main stream MS into the sscondary spout, a portion x of the diverted sample is diverted. When the gate assumes full open position covering the main spout 20 the entire cross-section y of the main stream is diverted. Finally as the gate returns to close the secondary spout 21 a portion z of the main stream is diverted. The gate is open only for the time necessary to divert a sample sufficiently large to have more than enough material to represent an entire transverse cross-sectional segment y.

The diverted sample x,y,z is then passed through a restricted orifice in the form of a mass flow hopper 60. A mass flow hopper is one that maintains simultaneous movement of all particles in the hopper. Slightly above the hopper the flow is laminar, i.e., all particles moving in parallel paths and at the same speed. The stream exiting the mass flow hopper is thus of a diameter less than the main stream and since the flow above the hopper is laminar it can be seen that the portions x,y and z of the main stream retain their relative positions or order as they are discharged from the mass flow hopper. It should also be understood that the portion y contains layers of particles which maintain generally the same order along the direction of flow in the secondary spout as they did in the main spout. This is a very important relationship since in effect the main spout stream at the restricted orifice of the mass flow hopper 60 becomes compressed and elongated but bears the same representative cross-section as in the main spout 20.

To simplify the explanation, the segment y in the secondary tube 21 is exactly the same as the segment y in the main stream such that a sample y' removed from the segment y in the secondary spout 21 will represent a transverse cross-sectional layer y' of the material in the segment y in the main spout.

Figure 3:
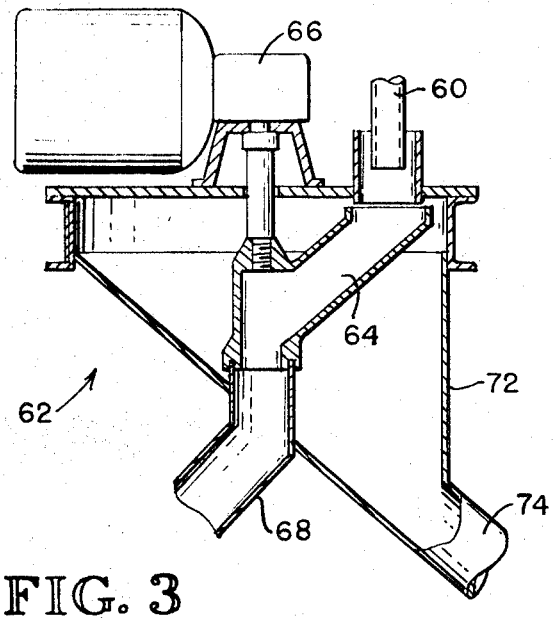
FIG. 3 illustrates a portion of a Vezin sampler employed in the preferred embodiment of the invention.
Figure 4:
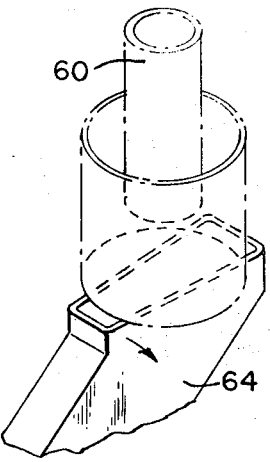
FIG. 4 is a detail of a portion of the Vezin sampler shown in FIG. 3.
Figure 7:
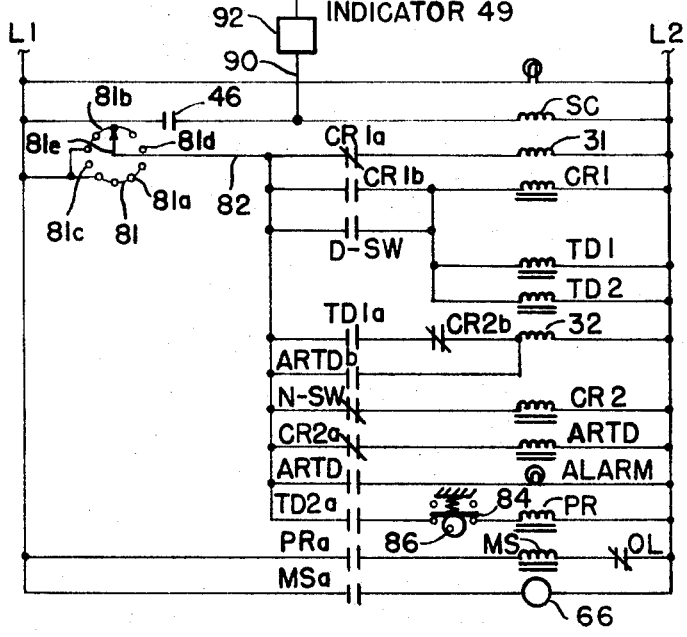
FIG. 7 is a preferred wiring diagram showing the control circuitry for automatic sampling as employed in the embodiment of FIG. 1.

In the preferred form of the invention the sample y' is obtained by use of the conventional Vezin sampler 62 shown in FIGS. 3 and 4 and is of the type manufactured by the Denver Equipment Company of Denver, Colorado under the designation Diverter/Divider. The Vezin sampler employs a rectangular conduit or receptacle 64 which sweeps beneath the mass flow hopper 60 and thus cuts through the reduced diameter stream of the secondary spout 21. The receptacle 64 is rotated by a highly accurate electric motor 66 which is energized after a predetermined delay to remove the portion of the stream y' only after the segment x has passed but before the segment z has been discharged. The timing of the cutter is dependent upon the speed of rotation of the motor 66, the size of the receptacle opening, and the flow rate throught the mass flow hopper 60. The control mechanism for initiating the motor operation will be described later with reference to the wiring schematic of FIG. 7.

The diverted sample y' removed by the receptacle 64 passes through a sampling tube 68 and is passed automatically into a sampling table 70 having a plurality of sampling containers 71. A typical sampling table is illustrated in U.S. Pat. No. 3,279,259 and further details are not necessary to an understanding of this invention. The excess material not removed by the receptacle 64 is discharged into a hopper 72 and then passes through a tube 74 back into the main hopper 34. The tube 74 has a discharge opening 76 directly above the main feeder 36 to assure flow through the tube.

As is readily apparent the unique concept of sampling an entire transverse cross-sectional of the main stream is applicable to other forms of processing equipment, bulk loading equipment, storage facilities etc. That is, while the sampler has been illustrated with reference to a bag packer it is not limited to such use. As mentioned above the sampler is also equally applicable to free-falling and full spout flow conditions. Other forms of devices for intercepting the main stream may also be employed. In this regard the broad concept of this sampler is to condition the stream for sampling by intercepting the entire transverse cross-section of the main stream momentarily and reduce the cross-section of the intercepted portion while maintaining the same order of abutting transverse layers of particles along the direction of flow. Still further it should be uderstood that the sample y' removed from the segment y of the secondary spout need not be removed by a Vezin type sampler but could be accomplished by another diverter valve like valve 22 or any other means which is operative to be timed to remove the necessary size sample.

The electrical controls for initiating the automatic sampling may be varied to obtain the desired frequency of samples and size of sample. In the preferred form the controls have been established to meet U.S.D.A. requirements, a brief explanation of which is helpful to an understanding of the invention. Lot sizes, that is a specified number of bags, are typically 6,400 or 800 bags or some number therebetween. Preferably a 10 percent sample is desired from each lot. Therefore if 640 samples were removed from the large 6,400 bag lot size and 80 samples removed from the smaller 800 bag lot size the requisite 10 percent sample could be obtained. A U.S.D.A. requirement is that the total sample per lot fall within the range of 5 and 6 pounds. For a 6,400 bag lot having 640 samples removed this would represent a sample of 4 grams for each sample removed. In the 800 bag size having only 80 samples removed this would require a 32 gram sample removed. In the particular form of secondary sampler used, i.e., the Vezin sampler, there are limits on the size of the opening, namely, it must generally be at least three typically large grain particles in width of the receptacle 64. There are also limitations on the rotational speed of the receptacle. Since these two factors are relatively unchangeable and the flow rate of the material is generally constant, in the preferred embodiment 120,000 pounds per hour in the main spout and 900 pounds per hour in the secondary spout, there is a general 130:1 reduction in the flow rate. In order to get the different 32 gram and 4 gram samples the rotational speed of the Vezin receptable 64 must be varied. For the 6,400 bags per lot the speed is 58 RPM in the preferred embodiment and for the 800 bag lot the speed is 7.25 RPM. Since the flow rate through the mass flow hopper 60 is constant the location in the primary sample or diverted portion from which the secondry sample y' is removed will vary but will still be removed from the segment y regardless of the rotational speed. If desired, of course, the Vezin motor could be initiated at different times to accommodate the variance in speed. A multi-pen strip chart recorder 78 is provided with pens designated to record with reference to time, lot size, sampling tube to which each sample is directed, and samples taken. This provides a visual indication of all variations in those factors critical to a determination of the condition and character of the total sample taken and its relation to the entire lot.

The control system of the preferred embodiment will now be described. In order to get the 10 percent sample required by U.S.D.A. regulations a sample is taken after every 10th bag has been filled. Generally it takes the filling time of several but less than ten bags to completely remove the sample and condition the control equipment for taking the next sample. A stepper switch 81 (FIG. 7) is provided with shorted contacts 81a and 81b open contacts 81c and 81d, and a movable contact or wiper 81e advanced by stepper coil SC. Each time the packer switch 46 is closed indicating that two bags have been filled the wiper switch 81e is advanced to the next contact. As an example, assume that the wiper contact 81e rests on an open contact such as 81c. At this time the diverter valve gate 22 is in the normal position with the flow being directed into the main spout 20. Line 82 is open since the wiper contact 81e is on open contact 81c. Divert limit switch D-SW is open indicating the diverter gate is not in the divert position. Normal limit switch N-SW is closed, indicating the diverter gate is in the normal position. All relays and diverter solenoids remain de-energized. The sampler motor is stopped.

When the packer switch is closed moving the contact 81e to the first shorted contact 81b, line 82 becomes energized. Diverter valve solenoid 31 becomes energized through normally closed contact CR1 moving the valve 30 to the right as shown in FIG. 1 introducing pressurized air to the left side of the piston in the piston-cylinder assembly 28 thus moving the diverter valve gate 22 into the position shown in FIG. 5 where the main stream flow is diverted into the secondary spout 21. When the diverter valve reaches its fully diverted position it closes the divert limit switch D-SW then energizes relay coil CR1. Energization of relay contact CR1 opens contact CR1a to deenergize the diverter valve solenoid 31 leaving the diverter valve gate in the diverted position. The relay CR1 is locked in an energized position through its own contact CR1b which become closed. Time delay relays TD1 and TD2 become energized and after approximately 0.3 seconds TD1 closes its contacts TD1a. Closing of contact TD1a energizes solenoid 32 through contact CR2b to return the valve 30 to the left introducing pressurized air to the right hand side of the piston in the piston and cylinder assembly 28 moving the diverter gate valve to normal position to block secondary spout 21 and return the main flow into the main spout 20. The 0.3 second delay allows diversion of sufficient flow to provide an adequate material portion for sampling. When the diverter valve gate was in the the divert position, normal limit switch N-SW was open. When the diverter valve gate is returned to its normal position the switch N-SW becomes closed energizing relay CR2 which opens normally closed contact CR2b to de-energize the solenoid 32 with the diverter valve gate thus remaining in the normal position. Relay ARTD is an alarm relay with a short time delay. If limit switch N-SW does not get closed indicating that the diverter valve gate has not fully returned to its closed normal position the relay ARTD will close contacts ARTDa to energize an alarm light or other signal and will close contact ARTDb to send another pulse to the solenoid 32 to again try to bring the diverter valve gate back to its normal position.

After an 8 second delay, a sufficient time to allow the segment x to be discharged so that the sample will be taken in segment y, time delay relay TD2 closes contacts TD2a energizing pulse relay PR through a motor limit switch contact 84. Pulse relay PR closes pulse relay contact PRa to energize a motor starter MS in line with an overload switch OL. Motor starter then closes motor contacts MSa to begin rotation of the sampler motor 66 at the desired rate of speed. Contacts PRa are two position contacts requiring a pulse to change them to each position. The first pulse closes the contacts and a a second pulse from the pulse relay PR is required before the contacts PRa are again opened. As a result the sampler motor 66 rotates through 360° to remove a sample from the stream flowing through the hopper 60. A cam 86 is coupled to the sampler motor and upon initial movement of the motor the cam moves the limit switch contact 84 off the energizing contacts against the force of a spring to de-energize pulse relay PR. When the receptacle 64 has made a 360° sweep the cam 86 allows the contact 84 to close to again energize pulse relay PR returning the contacts PRa to the open condition and thus de-energizing the motor 66. The circuit remains in this condition until the stepping switch has advanced to the next open contact 81d which occurs after 10 bags are filled. The next step of the stepping switch will again repeat the sampling cycle.

Line 90 connects a counter 92 to the digital indicator 49. Counter 92 is a conventional counter set to send a signal after 70 bags have been filled. This signal when received in the digital indicator will by well known means result in a zero weight print-out which will indicate if the load cell setting has drifted during the weighing operation.

While the preferred form of the invention has been illustrated and described it should be understood that the invention is not to be limited thereby. The principles of the invention are equally applicable to other embodiments well within the skill of the art. Accordingly the invention is to be limited only by a literal interpretation of the claims appended hereto.

The embodiment of the invention in which an exclusive property or privilege is claimed are defined as follows:

1. An inspection system for a solid particulate material packer having a spout emptying into a main hopper comprising means for successively placing bags under said hopper, means for counting the bags, means responsive to said bag counting means for automatically sampling a portion of the material in said spout after a predetermined number of bags have been filled, and means for weighing the filled bags and providing a readable print-out of the weight of the bags, said weighing means including means responsive to said bag counting means for automatically and repeatedly providing a zero weight print-out after predetermined numbers of bags have been weighed.

2. An inspection system for a solid particulate material packer having a spout emptying into a main hopper comprising means for successively placing bags under said hopper, means for counting the bags, means responsive to said bag counting means for automatically sampling a portion of the material in said spout after a predetermined number of bags have been filled, and means for weighing the filled bags and providing a readable print-out of the weight of the bags, said spout being full of material with no separation between particles of the material, said sampling means including a diverter valve in said spout for diverting the entire cross section of the material momentarily, a secondary spout for collecting the diverted material, said secondary spout having a mass flow hopper terminating in an opening of a cross section less than said main spout, and means for sampling a cross section of said material in said secondary spout.

3. An inspection system for a solid particulate material packer having a spout emptying into a main hopper comprising means for successively placing bags under said hopper, means for counting the bags, means responsive to said bag counting means for automatically sampling a portion of the material in said spout after a predetermined number of bags have been filled, and means for weighing the filled bags and providing a readable print-out of the weight of the bags, said sampling means including a receptacle of a cross section less than the dimensions of the restriction of said secondary spout mass flow hopper, means for sweeping said receptacle at predetermined velocity through the material falling from said mass flow hopper, and means for returning the unsampled diverted material to the main hopper.

4. A method of providing a sample from a moving main stream of solid particulate material, which sample is representative of the material within a cross-sectional segment of said stream, which comprises: intercepting said stream to obtain a portion of the entire stream that includes said cross-sectional segment; directing the intercepted stream portion into a zone such that an intermediate portion of material within said zone is representative of said cross-sectional segment and does not contain material intercepted during commencement and termination of the intercepting of said stream; and removing a cross-sectional sample exclusively from said intermediate portion, such that the sample contains material representative of the material within said cross-sectional segment, unbiased by commencement and termination of the intercepting of said stream.

5. The method of claim 4 wherein the intercepted stream portion traverses said zone in laminar flow and is discharged from said zone through a mass flow hopper at a reduced rate and in a stream smaller than said main stream and said sample is removed from the smaller stream and constitutes a cross-sectional segment of the smaller stream.

6. The method of claim 5 wherein said main stream is directed to a packer and wherein the remainder of the smaller stream is directed to said packer.

7. A sampler for providing a sample from a moving main stream of solid particulate material, which sample is representative of the material within a cross-sectional segment of said stream, which comprises means for intercepting said stream to obtain a portion of the entire stream that includes said cross-sectional segment; means providing an elongated zone for receiving the intercepted stream portion; a mass flow hopper for discharging the intercepted stream portion from said elongated zone in a substantially first in — first out manner at a reduced rate and in a stream smaller than the main stream such that an intermediate portion of material within said elongated zone is representative of said cross-sectional segment and is not biased by containing material intercepted during commencement and termination of the intercepting of said stream; sampling means for removing a cross-sectional segment from the smaller stream; and control means to cause said sampling means to remove a sample when the unbiased intermediate portion of material is being discharged in the smaller stream.

* * * * *